March 3, 1931.　　　　J. L. McATREE　　　　1,794,385

LIPSTICK

Filed July 30, 1926

INVENTOR
John L. McAtree
BY
ATTORNEYS

Patented Mar. 3, 1931

1,794,385

UNITED STATES PATENT OFFICE

JOHN L. McATREE, OF NEW YORK, N. Y., ASSIGNOR TO SCOVILL MANUFACTURING COMPANY, OF WATERBURY, CONNECTICUT, A CORPORATION OF CONNECTICUT

LIP STICK

Application filed July 30, 1926. Serial No. 125,898.

This invention relates to certain improvements in lipsticks.

Rouge or other cosmetic which is used in the form of a stick is generally dispensed from containers or cases from which the stick is ejected for use and then returned into the casing after use, and various constructions for effecting this have been proposed. For certain uses, it is desirable that the stick and the casing in which it is carried be oval or ovate in cross section, as such cases are conveniently handled, and pleasing in appearance. With such cases, however, the cosmetic carrier has been given a longitudinal movement in the casing, this movement being a sliding movement, and to get such a movement it was necessary to provide an inner casing having a slot and an outer casing to cover this slot, which made an expensive structure to produce.

It is a special object of the present invention to provide an ejector and return mechanism for lipsticks, and particularly lipsticks of oval or ovate form in which but a single casing and a rouge carrier are necessary.

A further object of the invention is to provide a lipstick container in which the casing is provided with a cover, and the stick is ejected from the casing by the act of opening the cover.

With these and other objects not specifically referred to in view, the invention consists in certain novel parts, arrangements and combinations which will be described in connection with the accompanying drawings and the novel features pointed out in the claims hereunto annexed.

In these drawings,—

Referring now to these drawings, the improved container will include a casing 1, and this casing, in the preferred construction, will be oval or ovate in cross section, but as to certain features of the invention it may assume other forms, as circular, for instance. Mounted for longitudinal movement in the casing 1 is a stick carrier in the form of a shell 2, which shell, for purposes hereinafter referred to, is formed with an enlarged portion 3 which has a close sliding fit with the inner walls of the casing 1. It will be observed that there is but one outer casing and the lipstick holder, and the outer casing is imperforate except at the top, through which the lipstick 4 protrudes.

Figure 1:
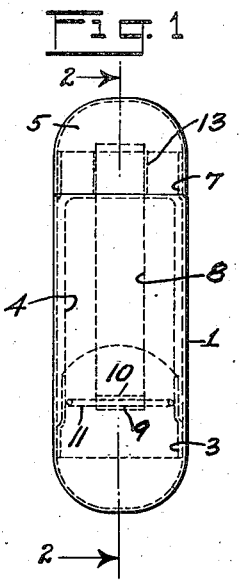
Figure 1 is a side view of the improved container, certain parts being shown in dotted lines.
Figure 2:
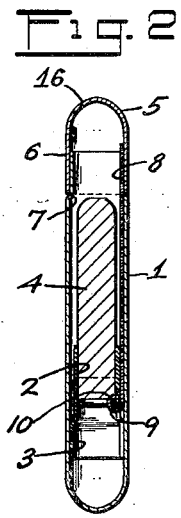
Figure 2 is a central vertical section, the view being taken on line 2—2 of Fig. 1.
Figure 3:
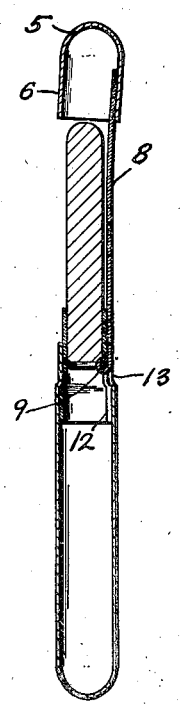
Figure 3 is a central vertical section showing the lipstick ejected from the container.
Figure 4:
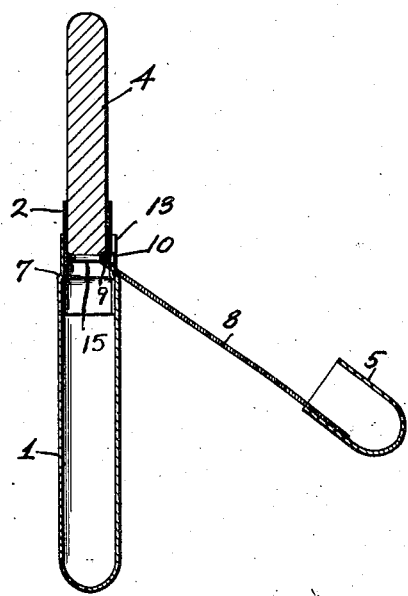
Figure 4 is a similar view showing the cover moved out of the way and the stick ready for use.

In accordance with the invention, means are provided for ejecting this stick for use and returning it to the casing after use. While various means may be employed for effecting these operations, the means embodying the invention in its best form will be such that they will be operated by uncovering the casing, so that as the casing is opened the stick is ejected for use and as the casing is closed the stick is returned therein. While these means may be varied within wide limits, in the particular construction shown, there is provided for the casing a cover 5 which has a flange 6 adapted for telescopic engagement with the top of the casing which is, as shown inset to form a shoulder 7. This cover has secured thereto, as by soldering or any other suitable manner, one end of a rod or strap 8 which extends downwardly inside the casing when the cover is closed and is pivotally connected to the stick carrier 2 by a pivot pin 9. This pin 9 extends through a knuckle 10 formed by turning over the end of the strap, as shown in Fig. 4, and projects beyond the knuckle, as shown at 11 in Fig. 1, and is secured to the inner side of the stick carrier by soldering or any other suitable way. The strap or bar thus has a sliding and swinging movement with respect to the casing, so that the cover is opened and lifted to the position shown in Fig. 3, the stick is ejected from the holder and, after it is ejected, the cover may be swung down, as shown in Fig. 4, and the stick is ready for use. The reduced neck 7 of the casing is cut away, as indicated at 12, and the holder as indicated at 13 forming slots to permit the parts to assume the position shown in Fig. 4. This construction permits the cover and strap to be swung downwardly toward the outer side of the casing and below the top thereof, so that the rouge or other cosmetic carried in the holder can be used till exhausted without any interference from the cover or strap.

Means are provided for preventing the holder from being withdrawn from the casing and, while these means may be of various characters, they will include a stop which may be conveniently formed by the large portion 3 of the holder engaging the shoulder 7 of the upper end of the casing, so that the holder cannot be entirely withdrawn from the casing. The stick, of course, may be held in the holder in any suitable way, as by a pin 15, or, if desired, the holder can be made with a bottom instead of open-ended, as shown. The shape of the cover may be varied as desired, but preferably will be rounded, as shown and as indicated at 16, as may also the bottom of the casing.

While the invention has been shown and described in its preferred forms, it will be understood that the ejector mechanism may be varied widely as to its specific form of construction, and that it may be used with cases other than those of oval form without departing from the invention as defined in the appended claims.

What I claim is:

1. In a lipstick, the combination with a casing having a neck inset to form a shoulder, a rouge holder in the casing having a projection for engagement beneath the shoulder, a cover for the casing, means connecting the holder and cover so that the holder is given a longitudinal movement in the casing when the cover is opened, and means for permitting the cover and connecting means to be swung downwardly below the top of the casing.

2. In a lipstick, the combination with a casing having a short slot in its upper edge, a holder in the casing having a slot, a cover for the casing, and a strap pivotally connecting the cover and holder and working in the slots when the cover is swung away from the casing.

3. In a lipstick, the combination with a casing, a rouge holder therein, a cover for the casing, a strap to which the cover is rigidly secured, pivotal connections between the strap and holder, and a slot in the rim of the casing for permitting the strap and cover to be swung downwardly below the top of the casing.

4. In a lipstick, the combination with a casing having a slot in its upper edge, a holder in the casing, a single strap pivoted at one end to the holder, and a cover secured to the other end of the strap, the strap being adapted to swing downwardly in the casing slot when the cover is raised to its full open position.

5. A toilet article for holding and applying stick material comprising a holder tube, a carrier member telescoping therein, a stick of relatively soft material operatively fixedly held by said carrier member, a cap and an arm rigidly secured thereto, said arm telescoping within said holder tube, and pivot means connecting said arm and said carrier member, whereby said cap is maintained substantially at a predetermined distance from said carrier member and is free of said stick material in all positions of the cap.

6. A toilet article for holding and applying stick material comprising a holder tube, a carrier member telescoping therein, said carrier member having a lower bearing portion and a reduced upper portion, a stick of relatively soft material operatively fixedly held between the opposite sides of said reduced portion, a cover member comprising a cap and an operating arm, said arm telescoping down within said carrier tube and occupying the space allowed for the sliding of said bearing portion, and means for connecting said arm to said reduced portion.

In testimony whereof, I have hereunto set my hand.

JOHN L. McATREE.